United States Patent Office 2,697,509
Patented Dec. 21, 1954

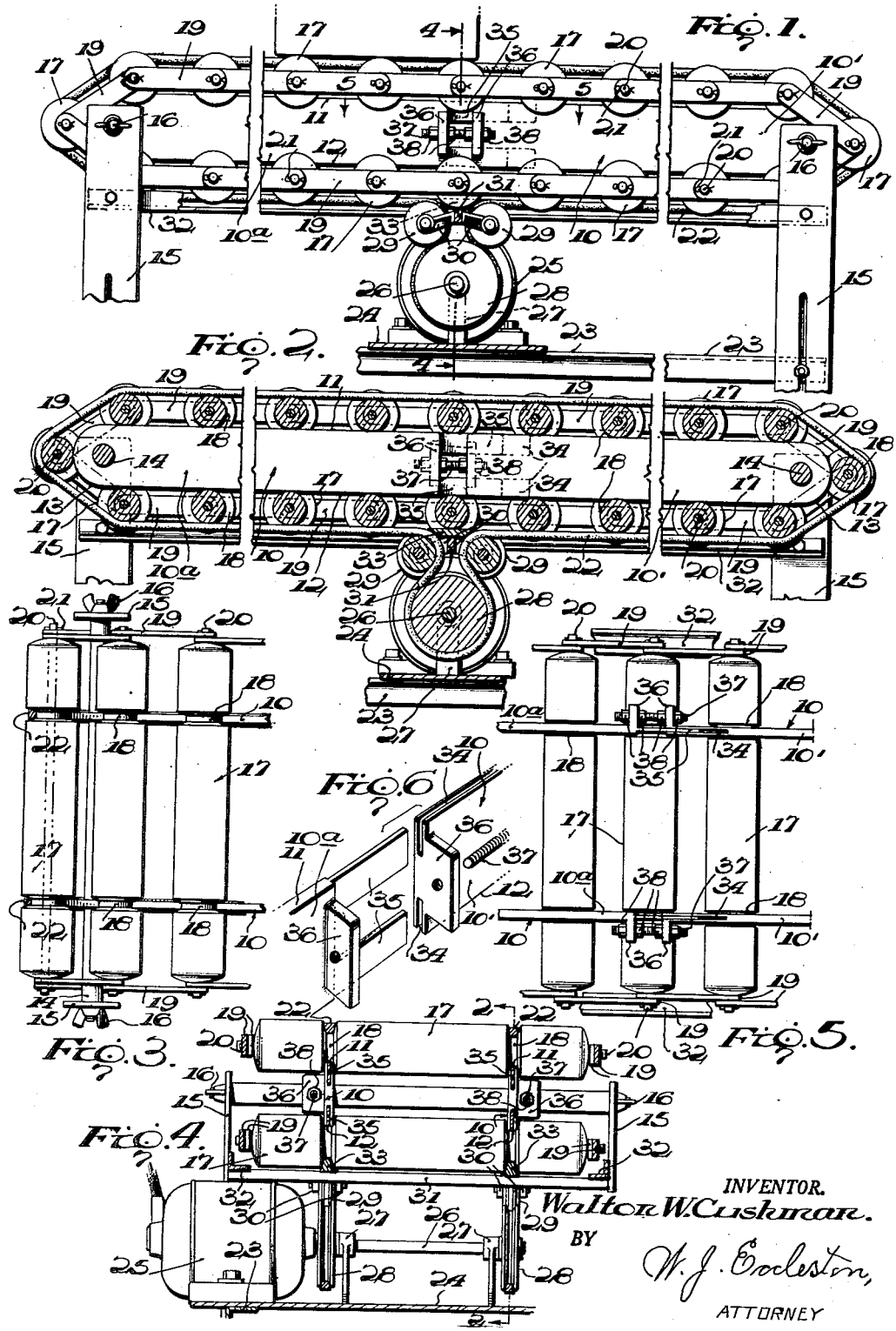

2,697,509

ROLLER CONVEYER

Walton W. Cushman, Webb City, Mo., assignor to the United States of America as represented by the Secretary of the Army Application December 7, 1953, Serial No. 396,794

8 Claims. (Cl. 198—183)

(Granted under Title 35, U. S. Code (1952), sec. 266)

The invention described herein, if patented, may be manufactured and used by or for the Government for governmental purposes, without the payment to me of any royalty thereon.

My invention relates to roller conveyors.

A primary object of the invention is to provide a powered roller conveyor, constructed so as to eliminate entirely the necessity for ball bearings or other frictionless type bearings, which are generally used for journaling the conveyor rollers to the frame of the conveyor.

A further object is to provide a powered roller conveyor wherein the individual rollers engage and travel about endless tracks which constitute the frame sides of the conveyor, the tracks serving to guide the rollers.

A further object is to provide novel and simplified belt driving means for a roller conveyor of the above-mentioned character, and novel means for increasing and decreasing the tension of the belts.

A still further object of the invention is to provide a powered roller conveyor which needs no lubrication.

A still further object is to provide a roller conveyor which is simplified in construction, extremely sturdy and durable, and relatively inexpensive to manufacture.

Other objects and advantages of the invention will be apparent during the course of the following description.

In the accompanying drawings, forming a part of the application, and in which like numerals are employed to designate like parts throughout the same, Figure 1 is a fragmentary side elevation of a powered roller conveyor embodying my invention;

Figure 2 is a fragmentary longitudinal vertical section taken on line 2—2 of Figure 4;

Figure 3 is a fragmentary plan view of the conveyor;

Figure 4 is a transverse vertical section taken on line 4—4 of Figure 1;

Figure 5 is a fragmentary horizontal section taken on line 5—5 of Figure 1, and, Figure 6 is an enlarged fragmentary exploded perspective view of one frame side or track of the conveyor.

In the drawings, where for the purpose of illustration is shown a preferred embodiment of my invention, the numeral 10 designates generally elongated parallel horizontal frame sides or tracks which are transversely spaced, as shown, and which may be of any desired length, depending upon the desired length of the conveyor. The tracks 10 are transversely narrow or thin, and of considerable width vertically, and arranged on edge, as shown. The tracks 10 are formed to provide upper and lower parallel longitudinal edges 11 and 12, for engagement with grooved rollers, to be described. The tracks 10 have their ends 13 rounded, as shown, so that the conveyor rollers may pass about the opposite ends of the tracks when traveling from the upper edges 11 to the lower edges 12, or vice versa.

Near their opposite ends, the tracks 10 are rigidly connected by transverse horizontal bars or shafts 14, rigidly secured thereto by any suitable means. The bars 14 extend between the tracks 10, and laterally outwardly thereof upon opposite sides of the same for substantial distances. Depending vertical legs 15 of any preferred length are rigidly secured to the ends of the bars 14, as at 16, and these legs 15 support the tracks 10 and associated elements at the desired elevation above the floor, ground or the like.

A plurality of cylindrical conveyor rollers 17, of wood, compressed fibrous material, plastics material, hard rubber or the like are provided. The rollers 17 are of uniform diameter, and substantially longer than the space between the parallel tracks 10. The rollers 17 are provided inwardly of their ends with annular grooves 18 of uniform diameter, and preferably somewhat tapered or V-shaped in cross section, as shown. The grooves 18 are spaced apart a proper distance for receiving the longitudinal edges 11 and 12 of the tracks 10, and the edges 11 and 12 are preferably somewhat beveled or knife-like in construction, for engagement within the grooves 18 with minimum friction. The rollers 17 are adapted to roll freely over the track edges 11 and 12 and around the track ends 13, during the operation of the conveyor.

In order to maintain the individual rollers 17 properly spaced apart longitudinally of the tracks 10, I provide a plurality of connecting links or plates 19, preferably formed of plastics material, adjacent the opposite ends of the rollers. The links 19 are apertured near their opposite ends for the reception of reduced axle extensions 20 of the conveyor rollers 17, and the axle extensions 20 may be rigid with the rollers 17 or may rotate relative thereto, as preferred. The connecting links 19 are preferably secured to the axle extensions 20 by means of cotter pins 21, or the like. The links 19 and axle extensions 20 require no lubrication, since the links are preferably formed of plastics material, and the axle extensions 20 are metal. The links 19 at the ends of the rollers 17 thus constitute an endless chain of links, the purpose of which is to maintain the rollers properly spaced apart during their movement about the tracks 10. The links 19 and axle extensions 20 are arranged inwardly of the legs 15, so that they may clear the legs during movement or operation of the conveyor.

The conveyor rollers 17 are powered by a pair of endless flexible belts 22, preferably somewhat V-shaped in cross section, for engagement within the grooves 18 of the upper and lower runs of the conveyor, Figure 2. The thickness of each belt 22 is preferably such that the belts will not project beyond the peripheries of the rollers 17, and the belts preferably have their outer sides substantially flush with or slightly below the peripheries of the rollers, as best shown in Figure 4. As shown in Figure 2, the belts 22 engage within the grooves 18 of all of the rollers 17, along the top and bottom sides of the conveyor and at the ends of the conveyor.

A pair of horizontal longitudinal angle bars 23 are rigidly secured near their ends to the inner sides of the legs 15, at any desired point above the bottoms of the legs, and these bars 23 extend for the entire distance between the legs 15, longitudinally of the conveyor. Near the longitudinal center of the conveyor, a motor mounting plate 24 is rigidly mounted upon the horizontal longitudinal bars 23, and rigidly supported thereby, and spaced a substantial distance below the tracks 10 and associated elements. An electric motor 25 is rigidly mounted upon the plate 24, near one side of the same, and has a horizontal transverse armature shaft 26 extending below and transversely of the lower runs of the belts 22, Figure 4. The armature shaft 26 may be further supported by bearings 27, in turn rigidly secured to the horizontal plate 24. A pair of relatively large grooved pulleys 28 are rigidly secured to the armature shaft 26, for rotation therewith, in vertical alignment with the lower runs of the belts 22, and the lower runs of the belts are trained about the grooved pulleys 28, as shown.

Pairs of relatively small grooved idler pulleys 29 are arranged near and above the large pulleys 28, in vertical alignment therewith and with the belts 22, Figure 2. The lower runs of the belts 22 are trained about the inner sides of the idler pulleys 29, as best shown in Figure 2, from whence the belts extend downwardly for engagement about the pulleys 28. The pairs of idler pulleys 29 are freely journaled upon generally horizontal support arms 30, having their inner ends rigidly secured by welding or the like to a transverse horizontal support bar 31. The support bar 31 extends transversely of the conveyor, near the bottoms of the tracks 10 and spaced somewhat below the tracks. The ends of the support bar 31 are rigidly secured to a pair of horizontal longitudinal angle bars 32, in turn rigidly secured to the inner sides of the legs 15, near the ends of the lower run of rollers 17, see Figure 4. The idler rollers 29 are thus supported by the support bar 31 and associated elements.

In order to bridge the gaps in the lower runs of belts 22, caused by the passage of the belts about the idler pulleys 29, I provide short track sections or guides 33 between the idler pulleys 29, and arranged at the elevation of the lower runs of the belts 22. The track sections 33 are preferably somewhat V-shaped in cross section, Figure 4, and preferably conform to the shape of the belts 22 in cross section. The track sections 33 are rigidly secured to the top of the support bar 31, and extend transversely thereof as shown in Figure 2. The track sections 33 are arranged to engage within the grooves 18 of the rollers 17, to support the rollers as they pass over the gaps in the lower runs of the belts 22, caused by the idler pulleys 29. With this arrangement, the rollers 17 are continuously supported as they travel along the lower edges 12 of the tracks 10.

I provide for adjusting the tension of the belts 22 by making the tracks 10 somewhat extensible and retractible longitudinally. This is done by dividing the tracks 10 near their longitudinal centers and actually making each track 10 form a pair of separate track sections, as best shown in Figure 6. One track section 10' of each track 10 is provided in its inner end and in its top and bottom longitudinal edges with narrow longitudinal grooves 34, of sufficient length to provide the desired adjustability for the track sections. The other track section 10a of each track 10 is provided at its inner end and adjacent its top and bottom longitudinal edges with longitudinal plate extensions or tongues 35, adapted to interfit with the grooves 34, and slidable therein. Laterally outwardly projecting apertured lugs 36 are rigidly secured to the outer sides of the track sections 10' and 10a, at the inner ends of these track sections, and preferably formed integral therewith. The apertured lugs 36 receive longitudinally extending screw-threaded adjusting pins 37, which lie adjacent to the outer sides of the tracks 10, in assembly, Figure 1. The screw-threaded adjusting pins 37 carry pairs of nuts 38, arranged upon opposite sides of the lugs 36, as shown in Figure 1. With this arrangement, the individual track sections 10' and 10a may be adjusted longitudinally, to render the tracks 10 somewhat longer or somewhat shorter, depending upon the desired tension for the belts 22. The interfitting tongues and grooves 35 and 34 provide a continuous track surface or edge for engagement with the grooves 18 of the rollers 17, regardless of the particular adjustment of the tracks 10 longitudinally, and there are no gaps in the top and bottom edges 11 and 12 of the tracks.

In operation, power is transmitted from the motor 25 to the belts 22, through the pulleys 28 and 29. The belts 22 are tight, and they frictionally engage all of the rollers 17, within the grooves 18 of the rollers.

The rollers 17 have their grooves 18 constantly engaging the top and bottom edges 11 and 12 and the ends 13 of the tracks 10. The upper run of rollers 17 have their weights supported by the tracks 10, and the load or loads to be conveyed are of course borne by the upper run of rollers. The lower run of rollers 17 is supported by the lower runs of the belts 22, as shown in Figure 2, and the belts are sufficiently taut to maintain the lower run of rollers in positive engagement with the lower edges 12 of tracks 10. Power is thus applied to all of the conveyor rollers 17, as the same travel endlessly about the tracks 10, and the plastic links 19 move with the rollers 17, and maintain them spaced apart properly.

By having all of the rollers 17 powered, and rolling along the tracks 10, rather than journaled between the tracks and held against movement longitudinally of the tracks, as is conventional, my roller conveyor will advance the package or load placed upon the upper run of rollers with a speed equal to twice the longitudinal speed of the rollers 17 along the tracks 10, and twice the speed of rollers which are journaled between the tracks and held against movement longitudinally thereof.

I contemplate building my roller conveyor in 10 ft. sections, with the rollers 17 approximately 18 inches long, although these dimensions may obviously be varied as found desirable, without departing from the scope of the present invention, and are merely to be taken as illustrative.

It is to be understood that the form of my invention, herewith shown and described is to be taken as a preferred example of the same, and that various changes in the shape, size and arrangement of parts may be resorted to, without departing from the spirit of the invention, or scope of the subjoined claims.

I claim:

1. In a roller conveyor, a pair of spaced substantially horizontal tracks having continuous top and bottom longitudinal edges and rounded ends, a plurality of rollers extending transversely of the tracks in spaced relation and having peripheral grooves receiving said top and bottom longitudinal edges and ends of the tracks, links connecting the rollers and maintaining the same spaced apart uniformly as they travel about the tracks, endless flexible elements engaging said grooves of the rollers and extending substantially entirely about the tracks and rollers and serving to support the rollers as they pass along the bottom longitudinal edges of the tracks, and means connected with the belts for driving the same longitudinally.

2. In a roller conveyor, a pair of spaced elongated endless tracks having top and bottom longitudinal edges, a plurality of rollers extending transversely of the tracks and having grooves receiving the top and bottom edges of the tracks, spacer elements connected with the rollers and maintaining them spaced apart uniformly throughout the full lengths of the tracks adjacent to the tops and bottoms of the tracks, endless flexible elements engaging said grooves of the rollers and extending above the rollers at the tops of the tracks and below the rollers at the bottoms of the tracks and adapted to drive all of the rollers, and means connected with the flexible elements to drive the same.

3. In a roller conveyor, a pair of longitudinally extensible endless tracks having top and bottom longitudinal edges, rollers extending transversely of the tracks adjacent the tops and bottoms of the tracks and having grooves receiving the top and bottom edges of the tracks, endless belts engaging the grooves of all of said rollers and extending above the rollers at the tops of the tracks and below the rollers at the bottoms of the tracks, means connected with the belts to drive the same longitudinally, and means connected with said extensible tracks to extend and retract the same.

4. In a roller conveyor, a pair of spaced substantially horizontal endless tracks having top and bottom sides and ends, a plurality of rollers extending transversely of the tracks and uniformly spaced about the top and bottom sides and ends of the tracks, the rollers being provided with spaced grooves receiving the top and bottom sides and ends of the tracks, whereby the rollers are guided as they roll about the tracks, links connecting the ends of the rollers for maintaining them spaced apart uniformly, endless flexible elements extending about the outer sides of the rollers and engaging said grooves of the rollers, and means connected with said endless flexible elements to drive the same.

5. A powered roller conveyor comprising a pair of elongated relatively thin track plates arranged on edge and having top and bottom longitudinal edges and curved ends, supporting means for the track plates to maintain the same elevated, a plurality of rollers extending transversely of the track plates and having grooves formed in their peripheries and receiving the top and bottom edges and the curved ends of the track plates, the rollers being adapted to roll about the marginal edges of the track plates, means connecting the rollers to maintain them spaced apart uniformly, endless belts passing about the outer sides of the rollers and engaging within said grooves, and means connected with the belts to drive the same.

6. A powered roller conveyor comprising elongated substantially horizontal track members having endless marginal track forming parts, a plurality of rollers extending transversely of the track members and having engaging parts receiving the marginal track forming parts and guided thereby as the rollers roll along the track members, means connecting said rollers to maintain them spaced apart uniformly, endless flexible elements extending about the outer sides of the rollers and engaging the engaging parts of the rollers, and means connected with the endless flexible elements to drive the same.

7. In a roller conveyor, a pair of elongated endless tracks, each track comprising separate longitudinally opposed track sections, interfitting means carried by the opposed ends of the track sections and movable to permit the tracks to be lengthened and shortened, adjustable means connected with the track sections to move the same longitudinally and lock them in the selected adjusted position, a plurality of grooved rollers extending transversely of the tracks and having their grooves engaging the tracks so that the rollers are guided as they roll about the endless tracks, elements connecting said rollers in a train and maintaining them spaced apart, endless flexible elements engaging the grooves of the rollers and adapted to drive the rollers about the tracks, and driving means for the endless flexible elements.

8. A roller conveyor comprising a pair of elongated substantially parallel endless tracks, supporting means connected with the tracks to hold the same elevated, a plurality of grooved rollers extending transversely of the tracks and engaging the tracks and adapted to roll about the tracks and having their opposite ends spaced laterally outwardly of the tracks, reduced end extensions carried by the rollers, apertured links connected with the reduced end extensions of the rollers and maintaining the rollers spaced apart uniformly, endless belts engaging about the outer sides of the rollers and received by the grooves of the rollers for driving the rollers, and means connected with the belts to drive them longitudinally.

No references cited.